United States Patent
Bender et al.

(10) Patent No.: US 7,626,947 B2
(45) Date of Patent: Dec. 1, 2009

(54) DYNAMIC OAM FOR SIGNALED CONNECTIONS (DOSC)

(75) Inventors: Chris Bender, Cranberry Township, PA (US); Ramprasad Santhanakrishnan, Wexford, PA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 709 days.

(21) Appl. No.: 10/649,492

(22) Filed: Aug. 27, 2003

(65) Prior Publication Data
US 2005/0048913 A1 Mar. 3, 2005

(51) Int. Cl.
*H04L 12/28* (2006.01)
(52) U.S. Cl. ............... 370/255; 370/241.1; 370/252; 370/236.2; 370/395.1; 370/352
(58) Field of Classification Search ......... 370/241–252, 370/216–228, 235, 235.1, 236, 236.1, 236.2, 370/397, 399, 409, 254–256, 395.1, 400, 370/408, 351–357
See application file for complete search history.

(56) References Cited

U.S. PATENT DOCUMENTS

| | | | | |
|---|---|---|---|---|
| 6,181,680 B1 * | 1/2001 | Nagata et al. | ............... | 370/248 |
| 6,563,795 B1 * | 5/2003 | Gruber et al. | ............... | 370/248 |
| 6,564,258 B1 * | 5/2003 | Uniacke | ............... | 709/223 |
| 6,600,749 B1 * | 7/2003 | Hayball et al. | ............... | 370/400 |
| 6,868,066 B1 * | 3/2005 | Fujita | ............... | 370/236.2 |
| 7,359,328 B1 * | 4/2008 | Allan | ............... | 370/236.2 |
| 2005/0147050 A1 * | 7/2005 | Klink | ............... | 370/244 |
| 2006/0209788 A1 * | 9/2006 | Boldt et al. | ............... | 370/352 |

* cited by examiner

*Primary Examiner*—Aung S Moe
*Assistant Examiner*—Christopher P Grey

(57) ABSTRACT

A telecommunications system. The system includes a first node. The system includes a second node. The system preferably includes at least one intermediate node in communication with the first node and the second node. The first node, second node and intermediate node defining a path. The first node repeatedly sending signaling through the intermediate node to the second node and receiving the signaling back to establish and maintain a connection between the first node, second node and intermediate node. The system includes means for dynamically placing connection points along the path through which the connection is established each time after signaling from the first node to the second node returns to the first node. A method for forming connections in a telecommunications system.

5 Claims, 1 Drawing Sheet

DYNAMIC OAM FOR SIGNALED CONNECTIONS (DOSC)

FIELD OF THE INVENTION

The present invention is related to dynamically placing connection points along a path through which a connection is established. More specifically, the present invention is related to dynamically placing connection points along a path through which a connection is established with use of an OAM path matrix disposed at each node of the path.

BACKGROUND OF THE INVENTION

Dynamic Engineering of OAM (Operations and Maintenance) functions and principles for ATM switched virtual connections are nonexistent. Dynamic OAM (operation and maintenance) for signaling ATM SPVX (switched permanent virtual paths or connections) will add principles and functionality to OAM protocols as well as enhance signaling for ATM connections.

This has been an issue for further study based on the ITU I.610. This specification also states that there is a need for reduced and/or additional OAM (Operation and Maintenance) functionality for this type of ATM connection.

Dynamic OAM for signaling ATM connections provides resolution to the engineering of OAM (Operations and Maintenance) when signaling ATM connections. The engineering encompasses a design for OAM feature areas such as performance monitoring and fault management.

Further, it will set forth principles, which may be utilized as an addendum to ITU I.610 or a separate ITU specification for signaling OAM ATM connections. These principles can subsequently enhance the OAM protocol for ATM connections as well as signaling ATM protocols.

Lastly, it will provide a framework by which signal OAM connection points can be signaled for fault management and performance monitoring using RSVP-TE with MPLS networks. Performance monitoring is currently not part of ITU Y.1711.

SUMMARY OF THE INVENTION

The present invention pertains to a telecommunications system. The system comprises a first node. The system comprises a second node. The system preferably comprises at least one intermediate node in communication with the first node and the second node. The first node, second node and intermediate node defining a path. The first node repeatedly sending signaling through the intermediate node to the second node and receiving the signaling back to establish and maintain a connection between the first node, second node and intermediate node. The system comprises means for dynamically placing connection points along the path through which the connection is established each time after signaling from the first node to the second node returns to the first node.

The present invention pertains to a method for forming connections in a telecommunications system. The method comprises the steps of sending signaling repeatedly from a first node, preferably through an intermediate node to a second node, the first node, second node and preferably the intermediate node defining a path. There is the step of receiving the signaling back at the first node to establish and maintain a connection between the first node, second node and intermediate node. There is the step of placing connection points dynamically along the path through which the connection is established.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
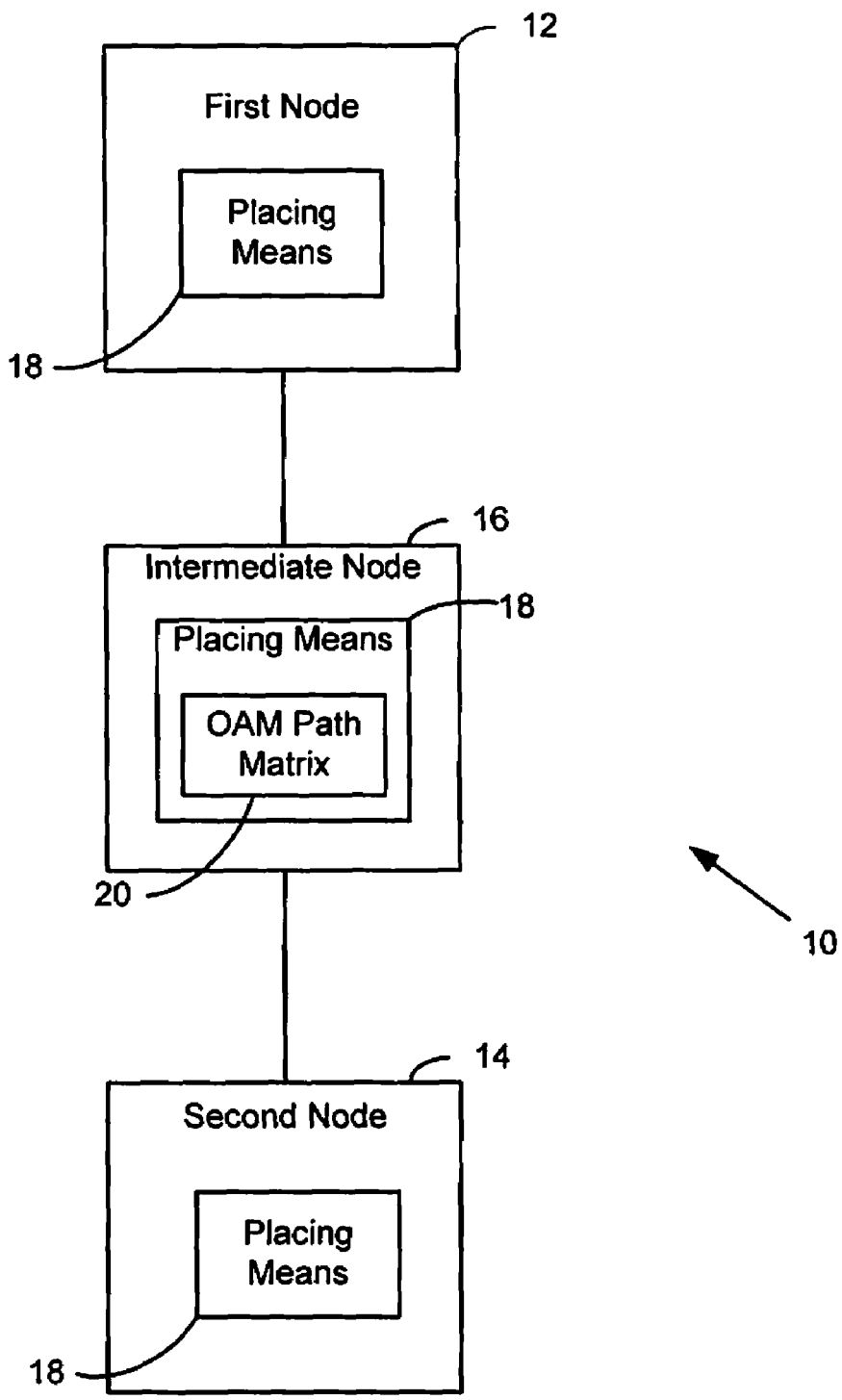
FIG. 1 is a schematic representation of the present invention.

Referring now to the drawings wherein like reference numerals refer to similar or identical parts throughout the several views, and more specifically to FIG. 1 thereof, there is shown a telecommunications system 10. The system 10 comprises a first node 12. The system 10 comprises a second node 14. The system 10 preferably comprises at least one intermediate node 16 in communication with the first node 12 and the second node 14. The first node 12, second node 14 and intermediate node 16 defining a path. The first node 12 repeatedly sending signaling through the intermediate node 16 to the second node 14 and receiving the signaling back to establish and maintain a connection between the first node 12, second node 14 and intermediate node 16. The system 10 comprises means for dynamically placing connection points along the path through which the connection is established each time after signaling from the first node 12 to the second node 14 returns to the first node 12.

Preferably, the placing means 18 also creates fault management and performance monitoring conditions in the first, second and intermediate nodes. The placing means 18 preferably includes an OAM path matrix 20 disposed at each node which identifies the connection points and the fault management and performance monitoring conditions. Preferably, the placing means 18 places the connection points according to the OAM path matrix 20 based on a number of hops to the second node 14 from the first node 12. The connection preferably is an ATM SPVX.

The present invention pertains to a method for forming connections in a telecommunications system 10. The method comprises the steps of sending signaling repeatedly from a first node 12 preferably through an intermediate node 16 to a second node 14, the first node 12, second node 14 and intermediate node 16 defining a path. There is the step of receiving the signaling back at the first node 12 to establish and maintain a connection between the first node 12, second node 14 and intermediate node 16. There is the step of placing connection points dynamically along the path through which the connection is established each time after signaling from the first node 12 to the second node 14 returns to the first node 12.

Preferably, the placing step includes the step of creating fault management and performance monitoring conditions in the first, second and intermediate nodes. The placing step preferably includes the step of identifying the connection points and the fault management and performance monitoring conditions with an OAM path matrix 20 disposed at each node. Preferably, the placing step includes the step of placing the connection points according to the OAM path matrix 20 based on a number of hops to the second node 14 from the first node 12.

In the operation of the invention, Dynamic OAM (operation and maintenance) for signaling ATM SPVX (switched permanent virtual paths or connections) uses newly engineered principles and functions to systematically create a CP (connection point), fault management and performance monitoring conditions, apart from creating connections. The same principles can be used for signaling MPLS. The following example is for ATM.

An OAM path matrix will instruct signaling code where to place connection points and types across the connection. The OAM path matrix is global across the network. Depending on the number of hops to the destination and the characteristics presented at configuration time, connection points can be identified and constructed on the signaling process's return. Characteristics can be defined as a combination of CP types, where they may be created, and their corresponding activations.

An algorithm will determine the actions of the switch depending on what OAM path matrix is induced and the number of nodes present in the connection, in turn this creates the high level signaled connection. This will result in fault management connection points and activations. For path connection this would entail an F4 configuration and for channel connection F5 is used.

During times of reroute, reset, fail over or reboots all OAM configurations can be maintained. The algorithm will rerun or reestablish the OAM configuration based on the characteristic and algorithm as described above.

An example of the OAM path matrix follows:

For an SPVP, which requires Segments with eteEnd characteristics and FPM_BR (forward performance monitoring and backward reporting) activation, the characteristic and the activation is passed whilst creating the signaled element.

The format of the characteristic is as follows:

F4 eteEnd F4 segEnd F4 segEnd F4 segEnd F4 segEnd F4 eteEnd

The number of hops or ports to be signaled follows.

A - - - B - - - C - - - D - - - E - - - F

The algorithm uses the global path matrix to determine that point A and F are eteEnd connection points.

When signaling passes through these points on its return path, segment and eteEnd CP will be placed at these points and an FPM_BR activation will be started if the user so desires when hop A is finally configured as the last step in the signaling process.

The remaining node count is 4. From the OAM path matrix all segEnd connections points are placed on the remaining hops. However, only one CP is required for every pair, therefore the OAM path matrix will instruct the placement to be on ports E and C. This is done globally as signaling is completed.

This illustration can be applied for a variety of scenarios or characteristics. As can be seen, a connection point is constructed for fault management, while performance monitoring, continuity checking, or both activations can be applied.

Additional attributes can be derived from signaled OAM. For instance, the ability to reroute of traffic based on certain levels of BER, and/or the loss of continuity when the neighbor network doesn't present a call clearing message.

Traditional OAM

OAM (operation and maintenance) typically requires engineering of connection points, and it's associated types (F4 ETE, F4 Segment, F5 ETE, F5 Segment, Intermediates) and characteristics, flows, directions, performance monitoring and fault management activations, after connections are configured or constructed, whether permanent or signaled connection is used. This engineering can be complicated.

Signaling for ATM connections, which is often the practice in large networks, does not include OAM because upon reroutes, fail over, resets and reboots the OAM configurations are lost. This is an inconvenience. This type of configuration isn't presented or discussed in ITU I.610.

OAM as defined by ITU I.610 (incorporated by reference herein), is a standard. If the standard is fully used, a switch may construct FM (fault management) and PM (performance monitoring) capability.

The standard covers semi-permanent and permanent virtual connections. The use and functionality of switched or signaled virtual paths and connections was not covered and left for further study. This was done primarily because signaling can be complicated, when done with OAM.

In order to create OAM on a connection, whether signaled or permanent, a connection point must be constructed on a switch port. This typically takes two steps. First, the connection is created then the OAM connection point is created.

The idea behind the methodology herein is twofold. First, it is a method and design to allow signaled connections to utilize OAM capability. Because of the inherit nature of signaling, OAM is difficult to construct. Signaling can create a new path or connection whenever there is a network or port. When an outage occurs, the number of ports and switches the connection or path takes to reroute may change. Therefore the process of creating OAM connection points on various numbers of ports and switches must be intelligent enough to create and recreate OAM connection points when paths change.

Secondly, it is a method that produces a dynamic capability for signaled connections to create OAM connections points all while signaling a connection or call. Another words it is a one step process versus two or three steps.

The following algorithm is pseudo software that intelligently assist a switch in determining how to dynamically create OAM (Operations and Maintenance) capability while signaling a connection. The software will be placed in every switch that makes up the connection path so the software is global.

OAM as defined by ITU I.610, is a standard. If the standard is fully used in software, a switch may construct FM (fault management) and PM (performance monitoring) capability. The algorithm presented here is designed so that FM, PM or both may dynamically be constructed.

The algorithm requires information to be passed to it by a user. With this information, the algorithm will build OAM CP (connection points) on various ingress/egress ports as the signaling creates a connection on its reverse path. This will apply to SVX and SPVX for ATM and RSVP-TE for MPLS.

The various port locations are determined using a CP placement matrix (small sample below).

Pseudo Algorithm

```
If Signaling FM (origination)
        Assign CP format (i.e. Segment, Segment with Intermediates,
End-to-end, End-to-end with Intermediates, End-to-end with
Segments, End-to-end with Segments and Intermediates)
        Modify OAM signaling IE field (indicate FM)
        Modify OAM signaling IE field (indicate PM)
        Modify OAM signaling IE field (indicate FM/PM)
        Modify OAM signaling IE field (indicate FM/PM/CC)
        Modify OAM signaling IE field (indicate CP format)
        Calculate total nodes
On Signal retrace
        If Path
            Check for prior CP
            Lookup CP placement table for Path
                If current switch/port requires CP
                    Build CP
        If Connection
            Check for prior CP
            Lookup CP placement table for Connection
            If current switch/port requires CP
```

-continued

```
                Build CP
If Signaling PM Complete
    If Path and either segment complete
        Activate Path FPM_BR using CP format in appropriate
        direction.
If Connection
        Activate Connection FPM_BR using CP format.
If Signaling CC
    If Path
        Activate Path CC using CP format.
If Connection
        Activate Connection CC using CP format.
```

Example of CP Placement Matrix (Path using Segments)

| Total Ports | Number of Dynamic CPs | CP Position |
|---|---|---|
| 1 | N/A | N/A |
| 2 | 2 | 1, 2 |
| 3 | 2 | 1, 3 |
| 4 | 3 | 1, 2, 4 |
| 5 | 3 | 1, 3, 5 |
| 6 | 4 | 1, 2, 4, 6 |
| 7 | 4 | 1, 3, 5, 7 |
| 8 | 5 | 1, 2, 4, 6, 8 |
| 9 | 5 | 1, 3, 5, 7, 9 |
| ... | | |

Notes
1. CP placement is created on Originating and Terminating ports always.
2. Number of Dynamic CPs are calculated as (TP/2 + 1).
3. Position of nodes are calculated (Always first and last. If TP is even number, distribute evenly after port 1. If TP is odd distribute on odd number ports.

There will be a placement matrix constructed for each value of the CP format above.

This example is simplistic. The matrix becomes more complex when End-to-end partitions are added, or when End-to-end partitions with segment intermediates are added. All of the partitions are defined by ITU I.610.

Signaling ATM and MPLS

ATM uses signaling protocol to construct a path or connection. MPLS uses RSVP-TE to signal a connection. ATM is purely a layer two Protocol, while MPLS can be a layer three protocol.

To be consistent, it is the intent of the methodology and application herein, to utilize RSVP-TE in the same manner as described above for signaling an ATM connection or path and its OAM capability.

MPLS and RSVP-TE will not use the same signaling fields as ATM to create the OAM connections points. However, the design, and use of other RSVP-TE fields will be used to create the OAM connection points dynamically while create the signaled or RSVP-TE connection.

In addition the design and use of a CP placement matrix will be utilized for MPLS RSVP-TE. In this case, there will not be a path (F4) and connection (F5) to the matrix.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A telecommunications system comprising:
   a network;
   a first node in communication with the network;
   a second node in communication with the network;
   at least one intermediate node in communication with the first node and the second node through the network, the first node, second node and intermediate node defining a path, the first node repeatedly sending signaling through the intermediate node to the second node and receiving the signaling back to establish and maintain a connection between the first node, second node and intermediate node; and
   software for determining an OAM (operation and path) matrix disposed in each node for placing connection points depending on characteristics in the OAM matrix and a number of hops between the first node and the second node along the path through which the connection is established each time after signaling from the first node to the second node returns to the first node, the OAM matrix creates fault management and performance monitoring conditions in the first, second and intermediate nodes, the OAM path matrix disposed at each node which identifies the connection points and the fault management and performance monitoring conditions, and instructs signaling code where to place connection points and types across the connection, the OAM matrix is global across the network, the OAM matrix maintaining OAM configurations during times of reroute, reset, fail over or reboots to reestablish the OAM configuration.

2. A method for forming connections in a telecommunications system comprising the steps of:
   sending signaling repeatedly from a first node through an intermediate node to a second node of a network, the first node, second node and intermediate node defining a path;
   receiving the signaling back at the first node to establish and maintain a connection between the first node, second node and intermediate node; and
   placing connection points dynamically along the path with an OAM (operation and path) matrix determined by software disposed at each node through which the connection is established each time after signaling from the first node to the second node returns to the first node, including creating fault management and performance monitoring conditions with the OAM in the first, second and intermediate nodes, the OAM matrix instructing signaling code where to place connection points and types across the connection, depending on characteristics in the OAM matrix and a number of hops between the first node and the second node, the OAM matrix is global across the network, the OAM matrix maintaining OAM configurations during times of reroute, reset, fail over or reboots to reestablish the OAM configuration.

3. A method as described in claim 2 wherein the placing step includes the step of placing the connection points according to the OAM path matrix based on a number of hops to the second node from the first node.

4. A telecommunications system comprising:
   a first node;
   a second node;
   at least one intermediate node in communication with the first node and the second node, the first node, second node and intermediate node defining a path, the first node repeatedly sending signaling through the intermediate node to the second node and receiving the signaling back to establish and maintain a connection between the first node, second node and intermediate node; and means for dynamically placing connection points along the path through which the connection is established after signaling from the first node to the second node returns to the first node, the placing means also creates fault management and performance monitoring conditions in the first, second and intermediate nodes, the placing means includes software for determining an OAM (operation and management) path matrix disposed at each node which identifies the connection points and the fault management and performance monitoring conditions, the placing means places the connection points according to the OAM path matrix based on a number of hops to the second node from the first node and characteristics in the OAM matrix, the OAM matrix maintaining OAM configurations during times of reroute, reset, fail over or reboots to reestablish the OAM configuration.

5. A method for forming connections in a telecommunications system comprising the steps of:

sending signaling repeatedly from a first node through an intermediate node to a second node, the first node, second node and intermediate node defining a path;

receiving the signaling back at the first node to establish and maintain a connection between the first node, second node and intermediate node; and placing connection points dynamically along the path through which the connection is established after signaling from the first node to the second node returns to the first node, including creating fault management and performance monitoring conditions in the first, second and intermediate nodes, including the step of identifying the connection points and the fault management and performance monitoring conditions with software for determining an OAM (operation and management) path matrix disposed at each node, including the step of placing the connection points according to the OAM path matrix based on a number of hops to the second node from the first node and characteristics in the OAM matrix, the OAM matrix maintaining OAM configurations during times of reroute, reset, fail over or reboots to reestablish the OAM configuration.

* * * * *